(No Model.)
L. J. ATWOOD.
ARGAND LAMP.
No. 466,551. Patented Jan. 5, 1892.
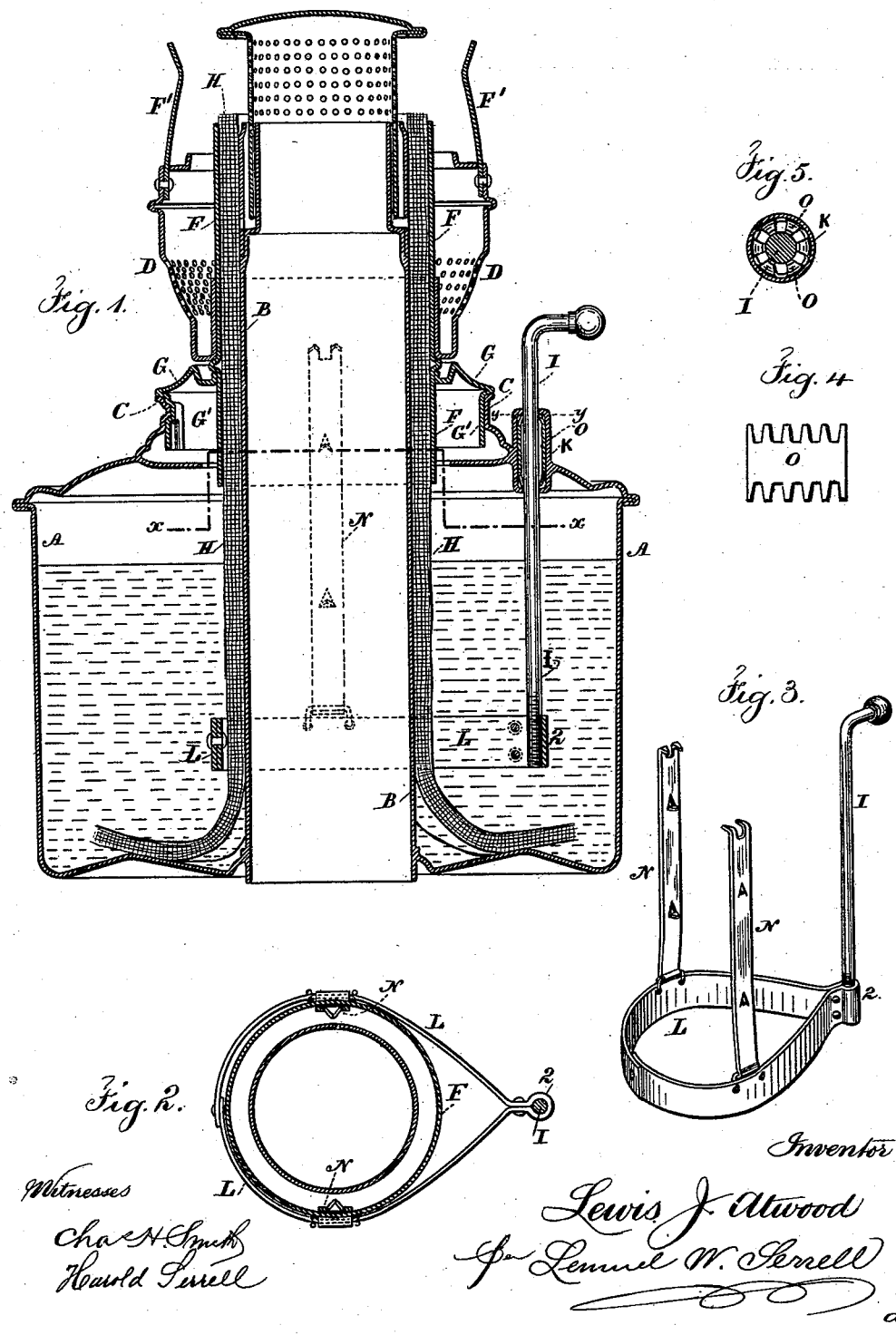

UNITED STATES PATENT OFFICE.

LEWIS J. ATWOOD, OF WATERBURY, CONNECTICUT, ASSIGNOR TO THE PLUME & ATWOOD MANUFACTURING COMPANY, OF SAME PLACE.

ARGAND LAMP.

SPECIFICATION forming part of Letters Patent No. 466,551, dated January 5, 1892.

Application filed March 2, 1891. Serial No. 383,393. (No model.)

*To all whom it may concern:*

Be it known that I, LEWIS J. ATWOOD, a citizen of the United States, residing at Waterbury, in the county of New Haven and State of Connecticut, have invented an Improvement in Argand Lamps, of which the following is a specification.

Lamps having a cylindrical wick around a central air-tube have heretofore been made and provided with a rod passing up through the fountain or reservoir, by which the wick can be raised or lowered by lifting upon the rod. In these cases it has been usual to attach the lower end of the wick to the wick-raising mechanism, and to effect this object the wick-raising mechanism has been removable from the reservoir.

In my present invention it is not necessary to remove the wick-raising mechanism from the reservoir, and the wick, of any desired length, can be introduced around the central air-tube and can be lifted from time to time and the wick-raising mechanism moved to its position upon the wick until the wick is so much consumed as to be too short.

My wick-raising mechanism is very simple and cheap to construct, and it holds the wick with reliability at any point to which it may be raised.

In the drawings, Figure 1 is a vertical section of a lamp fitted with my improvements. Fig. 2 is a sectional plan view below the line $xx$, showing the wick-raising mechanism; and Fig. 3 is a detached perspective view of such wick-raising mechanism. Fig. 4 shows the lifter-spring blank, and Fig. 5 is a sectional plan at the line $yy$ of Fig. 1.

The reservoir A is of any ordinary size and construction and provided with a central air-tube B. An annular opening is formed between the upper contracted end of the reservoir and the exterior of the air-tube, and usually a rim C is provided that is fastened to or formed with the upper part of the reservoir. A wick-tube F surrounds the wick and is provided with a flange G and a rim G', setting within the rim C and connected thereto by bayonet-slots or similar fastenings. The space between the wick-tube F and the air-tube B is sufficient for the cylindrical wick H, as usually provided in lamps of this character, and which may may be of any desired length, and when longer than the air-tube B the lower end of the wick may be split longitudinally, so as to spread outwardly upon the bottom of the reservoir. The wick-raising rod I passes through a short cylinder or socket K, which is fastened to the reservoir and forms a guide for such wick-raising rod I. It is advantageous to provide a frictional device within this cylinder K, which is preferably in the form of a short cylinder split at the ends to form spring-tongues, as represented in the detached view, Fig. 4. This spring O holds the rod I and the wick with which it is connected at any position to which the wick may be raised, and as hereinafter described it is advantageous to have as little friction as possible upon the wick, so that it may be raised or lowered easily, and by applying the friction to the rod I the lifting action upon such rod is directly in line with the friction, so that there is no tendency to springing the connections between the wick-raising rod and the wick itself. The wick-raiser L is in the form of a band, preferably elliptical, and provided with a socket 2, into which the lower end of the rod I passes, and is connected therewith, preferably, by screwing the rod into the socket. This wick-raiser L is of sufficient size to pass loosely around the wick. Hence the wick can be slipped down within this wick-raiser with facility or raised or lowered in relation thereto. Connected with this wick-raiser L are two or more claw-bars N, having projecting teeth or claws to enter the wick, and these claw-bars remain at their upper ends within the wick-tube F. Hence the wick-tube keeps the claw-bars in contact with the wick so long as said wick-tube is in place around the wick; but when the wick-tube F and its flange G are removed from the reservoir the claw-bars N can be swung away from the wick, leaving the wick entirely free to be raised or lowered, and then the claw-bars are pressed against the sides of the wick, while the wick-tube F is placed in its position around the wick so as to hold such claw-bars to the wick. By this simple construction the wick is entirely under the control of the wick-raiser, and the wick-raising devices do not have to be taken out of the lamp.

I find it advantageous to construct the wick-raising devices so that they may be put into the lamp after the lamp has been buffed and otherwise finished, and with this object in view it is advantageous to make the wick-raising band L elliptical, so that it may be passed in through a comparatively narrow opening between the upper end of the reservoir and the air-tube, and such wick-raiser will extend to the rod I, so that such rod I may be parallel, or nearly so, with the central air-tube and will not be in the way of the upper part of the lamp.

I have represented an air-distributer D with chimney-holding springs F', the same being applied around the upper part of the wick-tube F and resting at its lower end on the flange G or on a rib around the wick-tube.

I claim as my invention—

1. The combination, with the reservoir, central air-tube, and wick-tube in an Argand burner, of a sliding wick-raising rod passing above the reservoir, and means for holding the same in any position to which it may be moved, a wick-raiser band extending from the lower end of said rod and surrounding the wick loosely, and claw-bars connected with the wick-raiser band and held to the wick by the wick-tube, whereby there is no clamping friction upon the wick, substantially as specified.

2. The combination, with the reservoir, central air-tube, and wick-tube in an Argand lamp, of a wick-raising rod parallel, or nearly so, with the air-tube, a cylindrical guide and friction-spring applied to such wick-raising rod, a band connected with the lower end of the rod and passing loosely around the wick, and claw-bars connected with the wick-raiser band and passing at their upper ends within the wick-tube, whereby friction on the wick itself is reduced to a minimum and the friction necessary to sustain the wick is applied to the rod, substantially as set forth.

3. The combination, with the reservoir, central air-tube, and the wick-tube in an Argand lamp, of a wick-raising rod, a guide and friction-spring applied to said rod where it passes through the reservoir for sustaining the rod and wick, a wick-raiser band passing loosely around the wick and having a screw-socket for the lower end of the wick-raiser rod, and claw-bars connected to the wick-raiser band and passing at their upper ends within the wick-tube for moving the wick with little or no friction on the air-tube, substantially as set forth.

Signed by me this 25th day of February, 1891.

L. J. ATWOOD.

Witnesses:
GEO. F. PINCKNEY,
WILLIAM G. MOTT.